Aug. 14, 1951     M. W. MARIEN     2,563,853
PISTON PACKING RING
Filed April 21, 1948
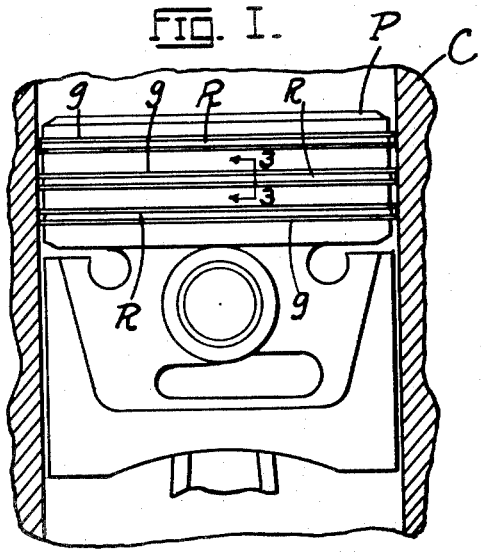
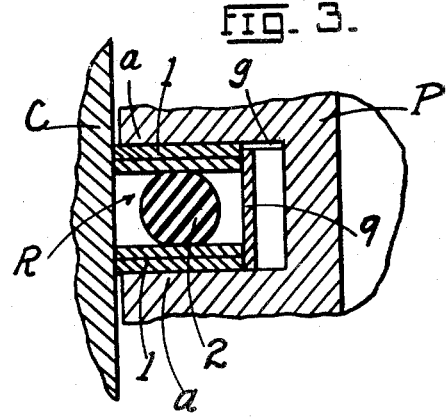
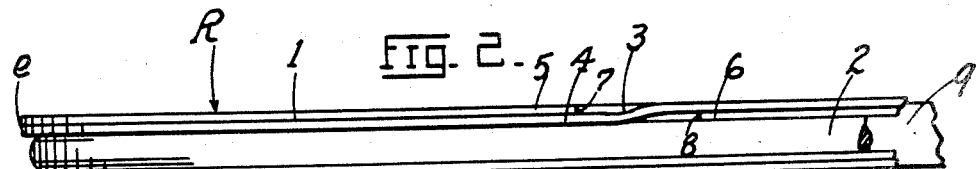
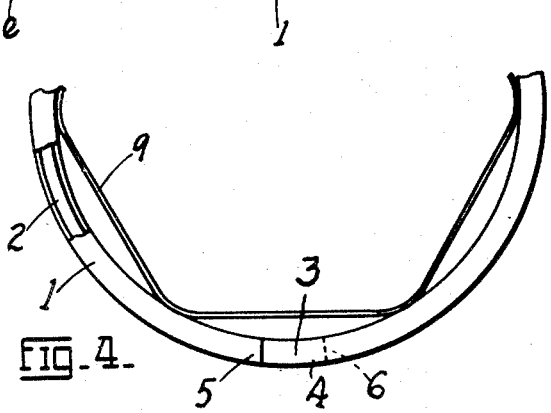
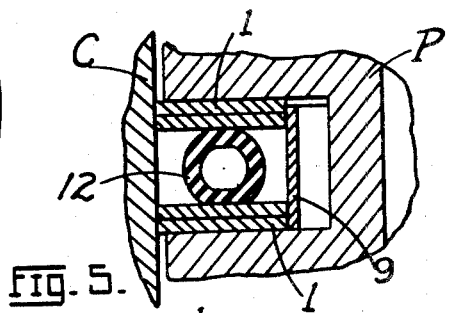
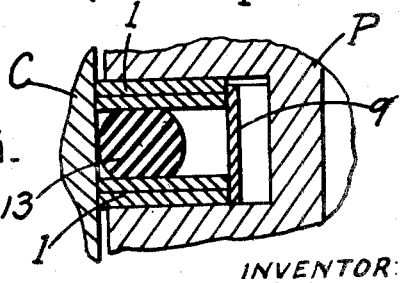
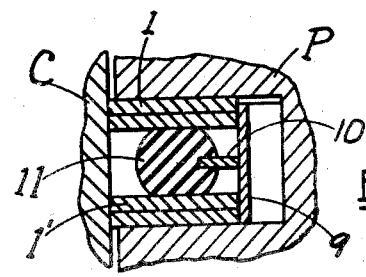
INVENTOR:
MELVIN W. MARIEN.
BY Harry L. Reimer
ATTORNEY

UNITED STATES PATENT OFFICE 2,563,853

PISTON PACKING RING

Melvin W. Marien, Brentwood, Mo., assignor, by mesne assignments, to Ramsey Corporation, a corporation of Ohio Application April 21, 1948, Serial No. 22,270

2 Claims. (Cl. 309—44)

My invention has relation to improvements in piston packing rings, and it consists in the novel features of construction more fully set forth in the specification and pointed out in the claims.

The invention is directed primarily to rings for pistons of internal combustion engines, but is equally adaptable to pumps and compressors. The principal object of my improved ring is to fit spaced segments, or ring components, into a ring groove without fixed clearance so there will be no space between the ring and the groove for leakage of oil or compression in operation. This is accomplished through the use of an elastic spacer yieldingly to hold the ring components in contact with the ring lands, and at the same time permit their expansion and contraction to maintain working contact with the cylinder wall. This object together with other advantages inherent in the invention will be better apparent from a detailed description of the invention in connection with the accompanying drawings, in which—

Figure 1 is a side elevation of a conventional piston equipped with my improved rings; Fig. 2 is an enlarged side elevation of the ring with part broken away; Fig. 3 is an enlarged cross-section taken on the line 3—3 of Fig. 1; Fig. 4 is a plan of my improved ring with parts broken away and Figs. 5, 6 and 7 are enlarged cross-sections, similar to that shown in Fig. 3, of modified forms of the invention.

Referring to the drawings, Figures 1 to 4, inclusive, C represents an engine cylinder in which a piston P operates. The piston P is provided with ring grooves $g$, $g$, $g$ in each of which is located my improved piston ring R. The ring R is, in effect, an assembly made up of two spaced segments, or ring components 1, 1 held in spaced relation by an elastic ring 2 of circular cross-section.

The ring components 1, 1, in the present instance, are formed in the shape of a two-coil helix of ribbon steel rolled in a true circular shape to present their outer thin edges $e$, $e$ to the wall of cylinder C. An offset 3 is provided in the coil 4 of the helix to permit the outer and inner coils 5 and 6 to lie in parallel planes (Fig. 2). The ends 7 and 8 of each component 1 are spaced to permit of free expansion and contraction of component 1 in operation.

The spacer ring 2 is composed of one of the synthetic rubbers (or plastics) that is capable of withstanding considerable heat without losing its physical characteristics. One such rubber is known in the trade as "Silicone" in that the carbon in the familiar hydro-carbon ring has been replaced by silicon. I make no claim to the specific substance but merely mention it as an example of a material suited to my purpose.

In view of the elasticity of the spacer ring 2 it need not have a gap but may be stretched over the piston P into groove $g$.

When the components 1, 1 are held in groove $g$ by spacer ring 2 the spacer is under compression (Fig. 3) so that pressure is exerted against the ring lands $a$, $a$. Therefore, it is desirable to augment the axial pressure of said components against the cylinder wall by means of a spring expander 9 of the well known polygonal form (Fig. 4) to overcome the frictional resistance to the expansion of the components 1, 1 in operation. Ordinarily the expander 9 will contact and exert pressure on the elements 1, 1 only.

However, in the modification shown in Fig. 7 I show a split ring insert 10 in spacer ring 11 and the expander 9 contacts the ring 10 to insure a fixed position of the spacer 11 relative to components 1', 1'.

In the modification shown in Fig. 5 the spacer 12 is made tubular, while in that shown in Fig. 6 the spacer 13 is of such diameter that it will contact the wall of cylinder C.

Having described my invention, I claim:

1. A piston packing ring assembly comprising thin flat annular split members in axially spaced relation, and a spacer ring under compression between said members the diameter of said spacer being less than that of the split members, said spacer consisting of a synthetic rubber made up of hydrogen and silicon.

2. A piston packing ring assembly comprising thin flat annular split members in axially spaced relation, a resilient spacer ring between said members forming a closed barrier therebetween, said spacer ring being in the form of a closed tube of a circular cross-section and of a diameter less than that of the split members.

MELVIN W. MARIEN.

REFERENCES CITED

The following references are of record in the file of this patent:

UNITED STATES PATENTS

| Number | Name | Date |
|---|---|---|
| 733,665 | Lemp | July 14, 1903 |
| 2,148,997 | Phillips | Feb. 28, 1939 |
| 2,240,624 | Marien | May 6, 1941 |
| 2,277,926 | Mayfield | Mar. 31, 1942 |
| 2,349,170 | Jackman | May 16, 1944 |
| 2,388,925 | Messinger | Nov. 13, 1945 |
| 2,446,224 | Frisby | Aug. 3, 1948 |
| 2,447,340 | Jackson | Aug. 17, 1948 |

FOREIGN PATENTS

| Number | Country | Date |
|---|---|---|
| 551,507 | Great Britain | Feb. 25, 1943 |